United States Patent [19]

Castellanos et al.

[11] 4,378,285
[45] Mar. 29, 1983

[54] GOLD RECOVERY APPARATUS

[75] Inventors: Juan D. Castellanos; Enrique C. Cardenas, both of Guadalajara, Mexico; Max B. Kelly, Miami, Fla.; Lorenzo J. Kelly, Miami, Fla.; Irving Glicken, Miami, Fla.

[73] Assignee: Mar Industries, Inc., Coconut Grove, Fla.

[21] Appl. No.: 237,755

[22] Filed: Feb. 24, 1981

[51] Int. Cl.³ .............................................. C25C 7/00
[52] U.S. Cl. ................................... 204/238; 204/239; 204/275; 204/276; 204/278
[58] Field of Search ............... 204/273, 275, 278, 274, 204/237–239, 228, 276

[56] References Cited

U.S. PATENT DOCUMENTS 4,149,954  4/1979  Ransbottom ...................... 204/271

Primary Examiner—R. L. Andrews
Attorney, Agent, or Firm—B. P. Fishburne, Jr.

[57] ABSTRACT

A simplified, safe, fast and economical method of refining gold and a versatile apparatus for practicing the method are disclosed. The process and the apparatus are ideally suited for reclaiming substantially pure gold from gold jewelry and gold alloy scrap. Gold alloy to be refined is inquarted with a non-ferrous metal or metal alloy and the resulting gold alloy is cast into slab anodes which are suspended in an electrolytic cell containing a mild nitric acid solution as the electrolyte. The cell includes a stainless steel container cathode to retain gold mud or slime precipitated from the slab anode during the electrolytic process. If platinum and/or palladium are present in the gold alloy to be refined inquartation with silver is carried out, and these platinum metals are dissolved in the electrolyte solution. If iridium or any other platinum metals are present in the gold alloy to be refined, they will remain in the resulting gold mud and subsequent treatment with aqua regia is necessary.

9 Claims, 5 Drawing Figures

GOLD RECOVERY APPARATUS

BACKGROUND OF THE INVENTION

Traditionally, gold recovery or refining from Dore gold or from gold alloy scrap, such as jewelry, has required the services of highly specialized and trained refiners because of the complexities of the processes involved and the dangers inherent in the use of materials involved in such complex processes. Previous to the late 1970s, gold in a pure state was extracted from ores or solutions by alkaline sulphides, leaching, or certain cyanide compounds which are extremely poisonous and dangerous.

During the late 1970s, when the price of gold dramatically increased, methods utilizing aqua regia or alkaline cyanide solutions became popular for this purpose. As stated previously, these prior art processes are very dangerous to human personnel because of the poisonous chemicals involved. The processes are also complicated and slow.

In a recent U.S. Pat. No. 4,182,671, issued Jan. 8, 1980, an electrolytic silver and gold refining cell and process is disclosed employing as an electrolyte a solution of apparently concentrated nitric acid and silver nitrate (a poisonous substance) in order to form silver at the cell cathode and gold at the anode.

One object of the present invention is to improve on the known prior art in general pertaining to gold recovery or refining and, in particular, to improve on the prior art exemplified by U.S. Pat. No. 4,182,671. This improvement involves, among other things, simplification of the process and the apparatus for carrying out the process. The process is rendered much safer, faster, more economical and more versatile in the present invention and the process and apparatus embodying the invention are utilized solely for refining gold and not for the refining of other metals. Concerning the apparatus, a number of components required in the prior art have been entirely eliminated. As a result of such simplifications, there is no longer a need to employ highly specialized and highly trained technicians for monitoring the process and apparatus and great skill is not required for these purposes. It is thought that the most important aspect of the invention is the use of a mild nitric acid solution in the electrolytic cell to refine gold to 99.9% purity where the gold alloy forming the slab anode is free of platinum or other platinum metals.

Other objects and advantages of the invention will become apparent to those skilled in the art during the course of the following description.

SUMMARY OF THE INVENTION

Gold alloy to be refined, Dore gold or scrap, is melted and inquarted to 4.8 Karat (20% gold), using copper or other non-ferrous metals or alloys of such metals in the inquartation process, except in the case of platiniferous gold, requiring the use of silver which can be later recovered. The resulting alloy is cast into rectangular slab anode form for suspension from an anode bar in an electrolytic cell employing an aqueous nitric acid solution as an electrolyte (40% $HNO_3$ at 70/100, 60% $H_2O$ + 2 grams of EADS* per liter of solution). This solution is supplied from the storage tanks which is then contained in a stainless steel container cathode.

*Ethylenedinitrilotetraacetic Acid Dissodium Salt-$(HO_2CCH_2)_2N(CH_2)_2N(CH_2CO_2NA)_2 2H_2O$ A DC current is applied to the electrolytic cell having a current density of 2-2.5 amps. per square inch of anode surface, with a voltage of 3-5 volts. A cooling system in the form of a water jacket is employed in the cell to prevent boiling of the electrolyte solution as a result of heat generated by this current and voltage.

As a result of electrolysis, the base metal, such as copper, is dissolved in the electrolyte solution. As this occurs, the gold in the slab anode precipitates to the bottom of the container cathode as a mud or slime. The solution is filtered from the slime which is then boiled in concentrated nitric acid or plain washed with ammonia hydroxide. The gold mud is again filtered, washed thoroughly with distilled water, dried and then heated to a molten state and given whatever shape is desired. The resultant gold is 99.9% pure.

Had platinum or palladium been present in the gold alloy slab anode and had the inquartation of the anode metal been done with silver, these platinum metals would have dissolved in the electrolyte solution. Had iridium or some other platinum family metals been present, they would have remained in the resulting gold mud or slime, requiring subsequent treatment for removal. Silver is recovered conventionally as by introducing metallic copper into the electrolyte solution in a holding tank, where the copper will displace silver in its nitrates to yield silver in metallic form. Other forms to precipitate silver, such as NaOH (sodium hydroxide), are readily available.

DETAILED DESCRIPTION

Figure 1:
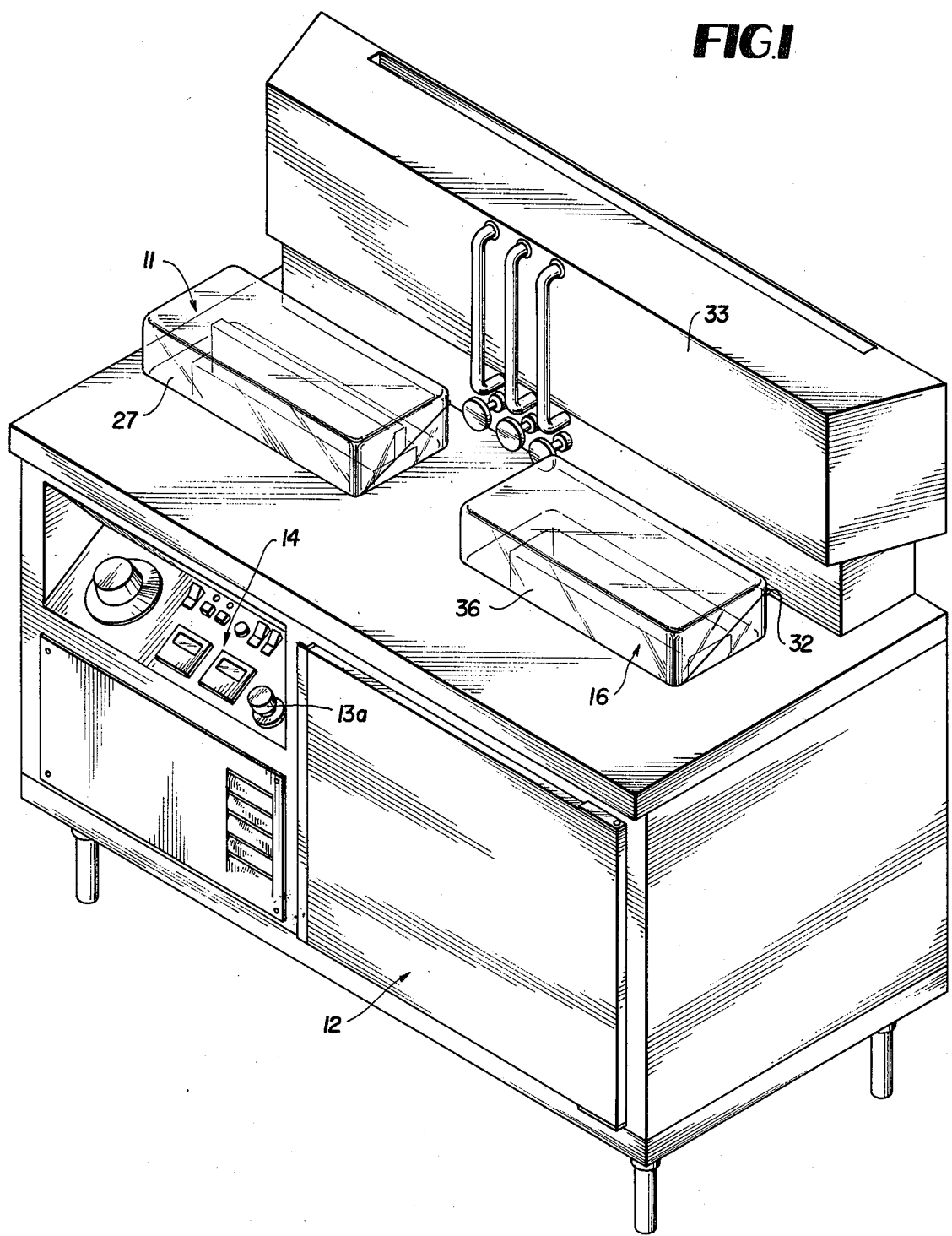
FIG. 1 is a perspective view of a gold recovery apparatus according to the invention.

Referring to the drawings in detail wherein like numerals designate like parts, the apparatus shown in its entirety in FIG. 1 is a self-contained unit constructed to take full advantage of the simplicity of the gold recovery process. The apparatus comprises seven main components, namely, a DC power supply 10 including transformer 10a and rectifier 10b; an electrolytic cell 11; pollution control system 12; cooling system 13 including circulating valves 13a; control panel 14; a filtering system 15; and a drying contrainer 16. These main components will be further described.

As previously noted, the process requires the inquartation of the gold alloy to be refined prior to placing the alloy slab anode into the electrolytic cell 11. The process also requires melting the pure gold powder which is ultimately produced by the process after all other process steps are completed.

The inquartation down to 4.8 Karat is accomplished by melting the scrap or jewelry gold alloy to be refined and adding to it a proper amount of a non-ferrous metal, such as copper, or other base metals or alloys. Silver is added only when platinum-type metals are present in significant amounts (more than ½ of 1%) in the alloy to be refined. This inquartation or alloying down is carried out in a melting furnace capable of developing temperatures of approximately 2200° F. to insure a homogeneous blend of the gold with the other metals. If needed, stirring of the molten metal with a graphite rod can be carried out to insure such a blend. The blended molten metal is then poured into an open-faced mold to shape it into a rectangular slab anode 17 having multiple sections 17a each measuring $1\frac{1}{2}''\times 3\frac{7}{8}''\times\frac{1}{8}''$ in a practical embodiment of the invention where six to seven ounces of pure gold per hour can be recovered. The invention is by no means restricted to these amounts or to the above dimensions and these factors may vary widely in practice. In fact, the versatility of the process and apparatus compared to the known prior art is one of its key features and advantages.

For the purpose of the instant description, it is assumed that the gold alloy to be refined is free of platinum metals and consequently copper can be used to achieve inquartation. To further facilitate the description, it is assumed that 22 Troy ounces of 14K gold are to be refined. This gold has the following analysis by weight:
Gold = 12.8 Troy ounces 14/24 = 12.8/22
Silver = 4.60 Troy ounces 5/24 = 4.6/22
Copper = 4.6 Troy ounces 5/24 = 4.6/22

Since this gold alloy requires inquartation to 4.8 Karats, or 20%, sufficient copper must be added to it in the melting furnace to bring the weight of the gold present to the weight of the silver and copper to the ratio of 1:4.

If gold in the amount of 12.8 Troy ounces is present in the alloy, as stated, and there is also present 9.20 ounces of silver and copper, then 42 ounces of additional copper must be added in the furnace. The resulting alloy will have the following make-up:

| Gold = | 12.8 Troy Ounces | 4.8/24 = 12.8/63 |
|---|---|---|
| Silver = | 4.6 Troy Ounces | |
| Copper = | 45.6 Troy Ounces | |
| | 63.0 Troy Ounces | |

The specific gravity of this alloy when cast into a slab will be:

| Gold | 12.8 × 10.20 Troy Ounces/cu. in. = | 130.56 |
|---|---|---|
| Silver | 4.6 × 5.548 Troy Ounces/cu. in. = | 25.52 |
| Copper | 45.6 × 4.710 Troy Ounces/cu. in. = | 214.77 |
| | 63.0 | 370.85 |
| Specific Gravity = 370.85/63.0 = 5.88 | | |

Figure 4:
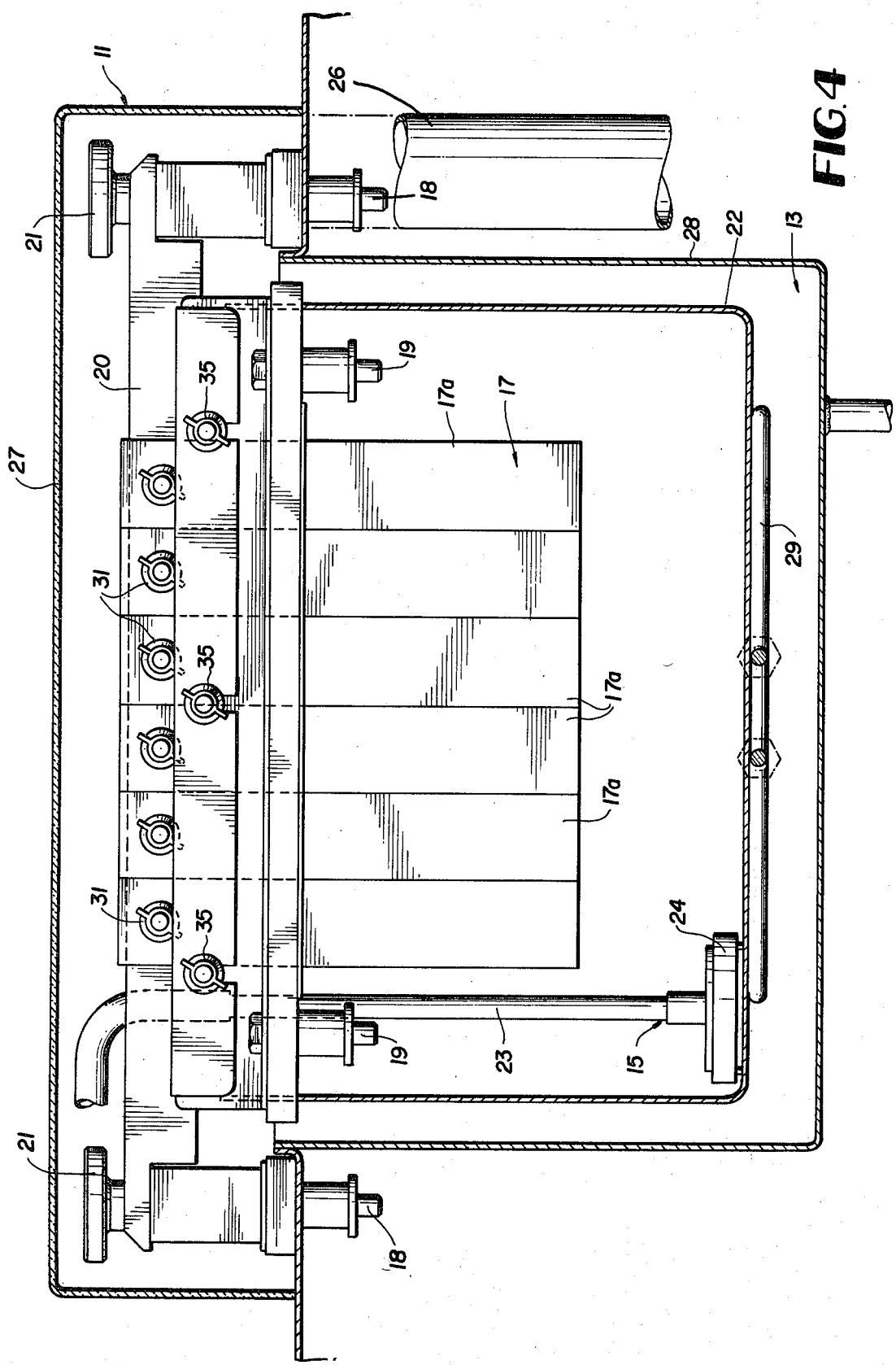
FIG. 4 is an enlarged front elevation of an electrolytic cell forming a part of the apparatus.

With 36 ounces of 4.8 Karat gold alloy to be refined at the stated specific gravity, the anode in the electrolytic cell will consist of seven slab sections 17a each measuring $1\frac{1}{2}''\times 3\frac{7}{8}''\times\frac{1}{8}''$. Once these are cast, they are ready to be placed in the electrolytic cell 11 shown in detail in FIGS. 4 and 5.

The DC power supply 10 is derived from a 110 volt three-phase 60 Hertz semiconductor silicon rectifier 10b, capable of delivering 250 amps. at 3–5 volts. At this capacity, the DC power supply can produce a current density of 2–2.5 amps. per square inch, which is in the range necessary to carry out the process. This current is delivered to the cell 11 through standard electrical connections 18 and 19, FIGS. 4 and 5.

The electrolytic cell 11, which is a key element of the invention, additionally comprises a removable stainless steel anode bar 20 conventionally connected as at 21 to the positive terminals 18, and a removable stainless steel container cathode 22 conventionally connected to the negative terminals 19. The cell 11 is constructed so that the anode slab sections 17a are within the container 22 or tank and centered therein on the longitudinal axis thereof. Preferably, the anode bar 20 is located $10\frac{1}{2}''$ above the floor of container cathode 22. The anode bar is electrically insulated by conventional means from the container cathode 22.

The filtering system 15 is inserted in the container cathode 22 and consists of a $\frac{3}{8}''$ tube 23 with a 5 micron filter 24 at its lower end on the floor of container cathode 22. A peristatic and reversible pump 25 creates the necessary suction to filter the liquid electrolyte and washing solutions from the gold slime formed in the bottom of the container cathode 22. The filter is self-cleaning by backwash provided by the reversible pump.

Within the cell 11, there is an outlet 26 for fumes which are produced by the electrochemical reaction in the container cathode 22. A lid 27 of transparent polycarbonate or the like covers the cell 11 to prevent the escape of fumes from the top of the container cathode 22, which is open.

The side walls of the container cathode are surrounded by the cooling system 13 which includes a jacket 28 through which cooling water is allowed during the gold recovery process by closing and opening valves 13a, one of which admits and one of which drains the cooling water. This cooling system dissipates heat generated by the reaction, thus preventing boiling of the electrolyte solution. A heating coil 29 attached to the bottom wall of container cathode 22 is activated only during the hot nitric acid bath at the terminal portion of the process to cause boiling of the acid. Alternatively, an ammonium hydroxide bath can be employed in lieu of the acid bath without boiling.

Figure 5:
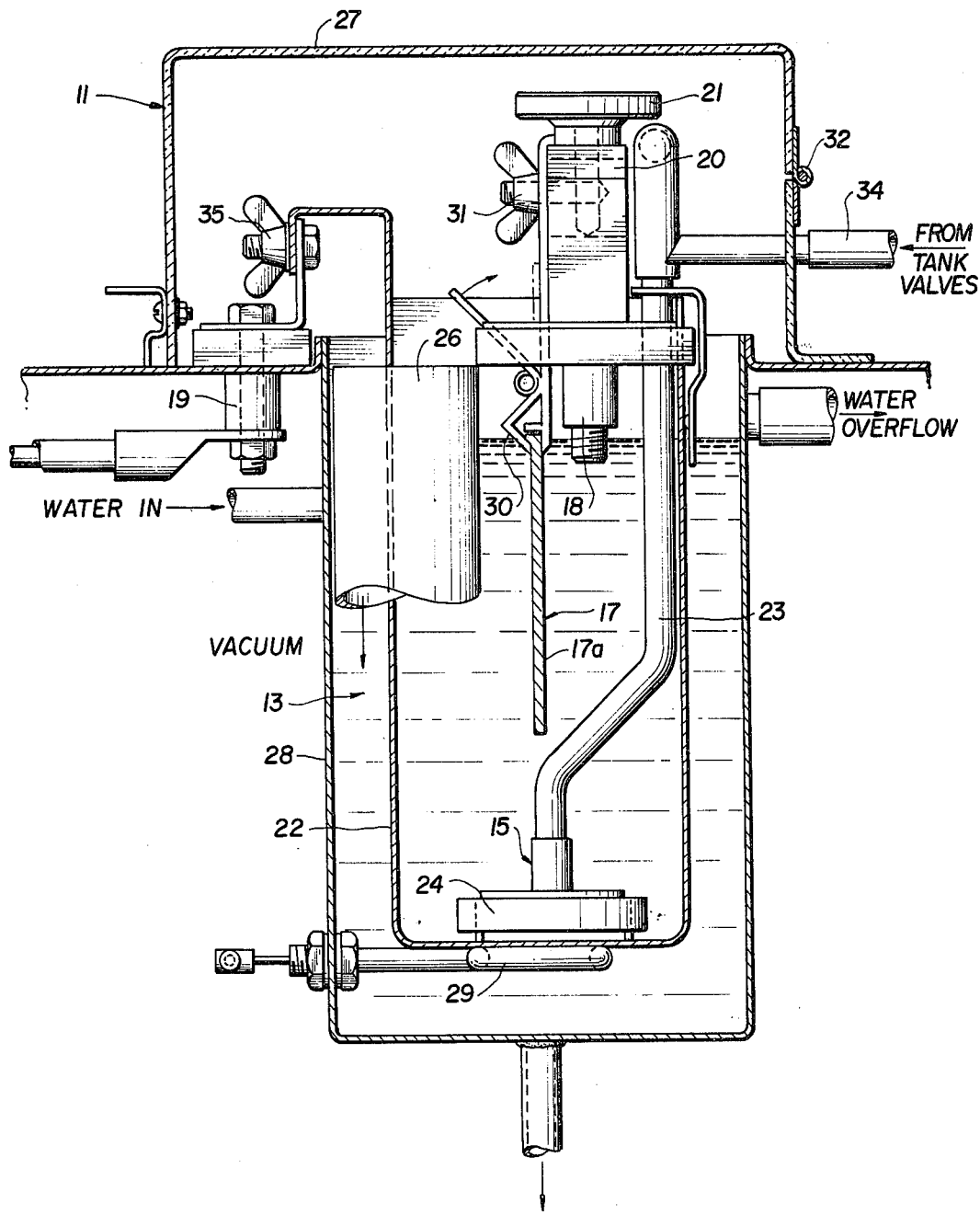
FIG. 5 is a side elevation of the cell.

The slab anode sections 17a forming the complete slab 17 of inquarted gold alloy are inserted into titanium clamp 30, FIG. 5, which are secured to the anode bar 20 as by fastener means 31. The electrolyte is now poured into container cathode 22 to completely cover slab anode 17. 6.5 liters of electrolyte is required to cover the seven $1\frac{1}{2}''\times 3\frac{7}{8}''\times\frac{1}{8}''$ slab sections in the illustrated embodiment. The lid 27 hinged at 32 is closed and the DC power supply is turned on. This automatically activates the blower of pollution control system 12, not shown.

As a result of the electrochemical process in the cell, all silver and copper in the slab anode 17 is dissolved in the electrolyte solution and the refined gold falls to the bottom of container cathode 22. When the slab anode 17 disappears, signalled by the absence of current flow, the precipitated gold in the form of a mud or slime will rest on the floor of the container cathode.

At this point, the filtering system 15 is turned on to filter the electrolyte from the gold in the container cathode. The 5 micron filter 24 prevents passage of gold through the filter. Once the used electrolyte is filtered, the system is turned off and enough concentrated nitric acide or ammonia hydroxide is poured into the container cathode from overhead storage tanks 33 of the apparatus via tubing 34 to cover the gold mud contained at the bottom of the cathode. Normally, this will require about $\frac{1}{2}$ liter of nitric acid. The heating element 29 is turned on to bring the nitric acid to a boil for about five minutes. If ammonia hydroxide is used, no boiling is necessary, as stated. When this process is completed, the filtering system 15 is again activated to filter the used nitric acid or ammonia hydroxide bath. The system is turned off and distilled water from the overhead tanks 33 is delivered into the container cathode 22 to wash the gold mud therein. This wash water is then filtered from the container cathode and a second washing of the gold mud with distilled water, followed by filtering of the water from the container cathode 22, is carried out.

Figure 3:
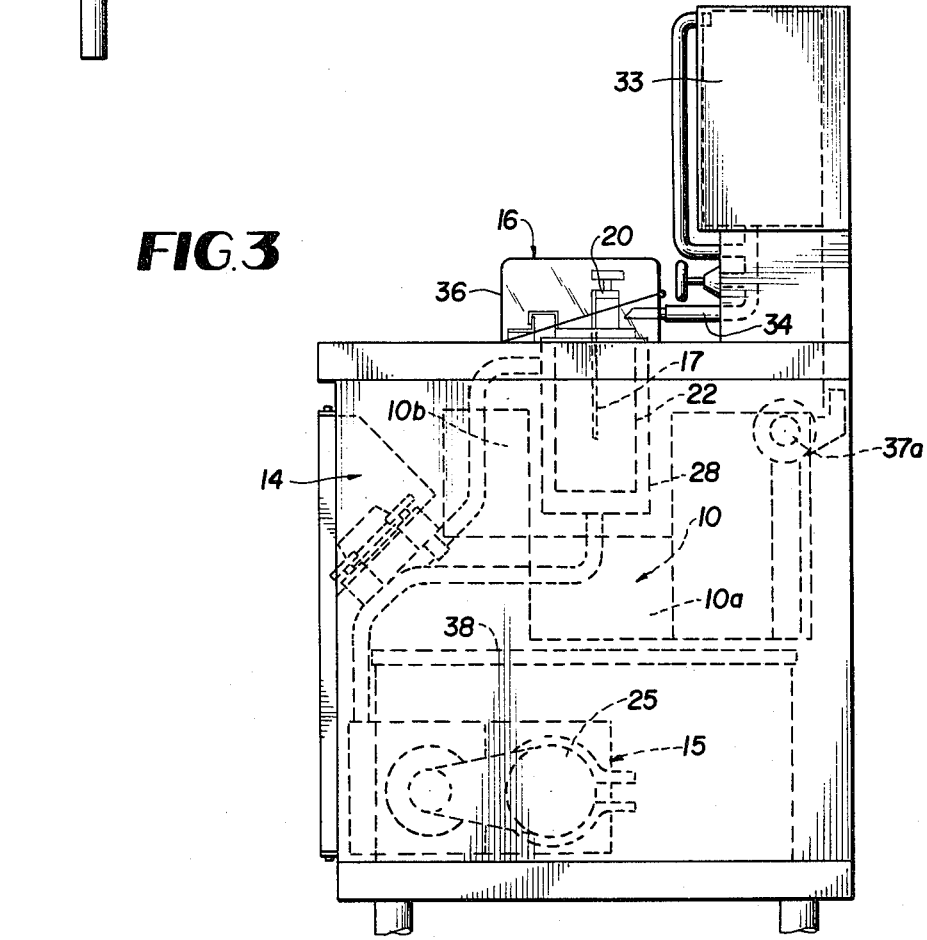
FIG. 3 is a side elevation of the apparatus.

The container cathode 22 held by releasable fasteners 35 is now removed from the electrolytic cell 11 and placed in the drying compartment 16 of the apparatus, as best shown in FIG. 3. Drying is continued in the compartment 16 until the moisture content of the gold mud is sufficiently low to allow emptying of dry gold powder from the container cathode. This operation usually requires five to ten minutes, following which the lid 36 of the drying chamber is opened, the container cathode is removed and inverted to deposit the pure gold powder in a collection receptacle. From this receptacle, the gold powder can be placed in the same melting furnace used for inquartation, where the refined gold is returned to a molten state and can be poured into an appropriate mold.

The pollution control system 12 beyond the outlet 26 of the electrolytic cell continually draws fumes from the cell through a water and caustic soda stripping solution, to neutralize the NO and $NO_2$ fumes. The fumes are drawn by a blower 37a, FIG. 3, from the outlet 26 into a stainless steel tank 37 containing the stripping solution. When this solution becomes saturated, it is replaced with fresh solution.

Figure 2:
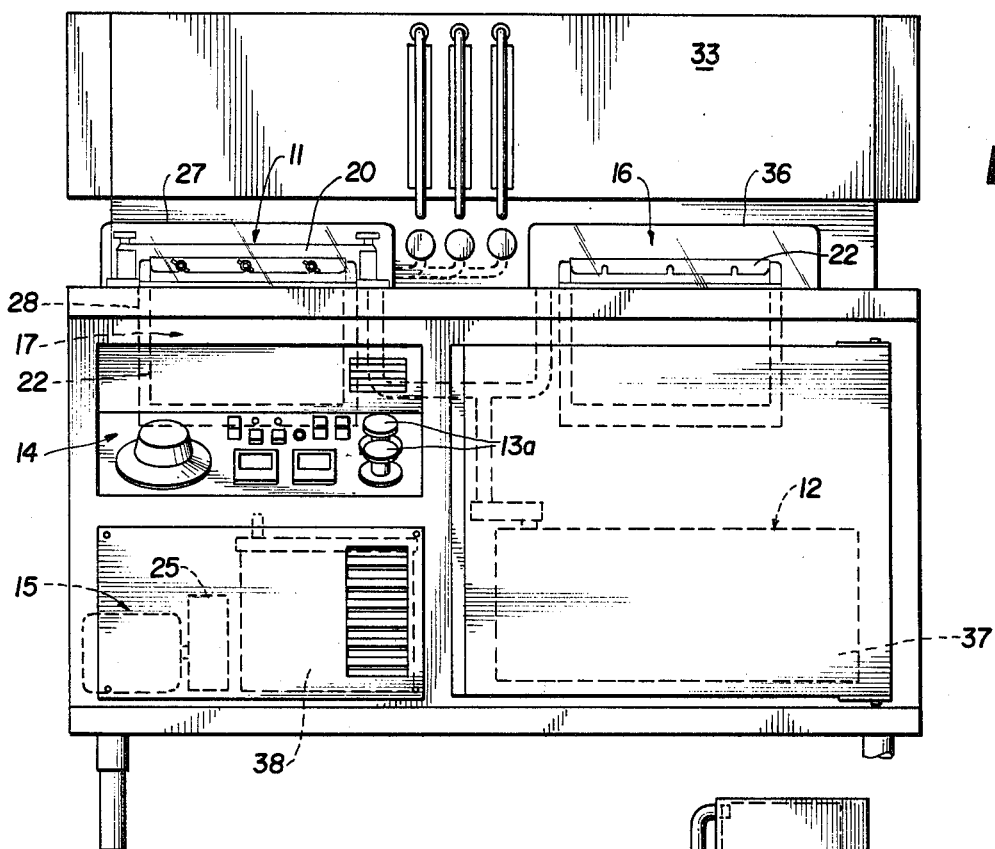
FIG. 2 is a front elevation thereof.

The electrolyte, nitric acid and distilled water removed from the container cathode 22 have, in different concentrations, amounts of silver in the form of silver nitrate in solution (Ag $NO_3$) which, due to present market value of about $20 per Troy ounce, is profitable to recover. Recovery is accomplished by introducing metallic copper or Na OH into the solution in an electrolyte holding tank 38 below the cell 11, FIGS. 2 and 3. Copper will displace silver in the silver nitrate to yield silver in metallic form. This silver is filtered from the rest of the solution and washed and dried prior to melting.

The apparatus control panel 14 is constructed so that whenever the DC power supply 10 is activated the pollution control system 12 is also activated. Also, when the heating element 29 is energized, the pollution control system 12 is turned on automatically. The heating element 29 and the DC power supply 10 cannot be switched on simultaneously. These electrical controls are state-of-the-art controls and need not be described in detail.

The reaction occurring in the cell 11 can be described as follows. The nitric acid, being an electrolyte, the current passing through the cell during the process causes oxidation of the silver and base metals in the slab anode 17. The following ionic reaction occurs:

$$Ag - Ag^+ + e-$$

$$Cu - Cu^{+2} + 2e-$$

$$Zn - Zn^{+2} + 2e-$$

and so on, depending on the other metal being present in the anode slabs.

These metallic ions, under the electromotive force impressed on the cell, travel to the cathode 22 and are desposited thereon with the following ionic reaction:

$$Ag^+ + e- -- Ag$$

$$Cu^{+2} + 2e- -- Cu$$

$$Zn^{+2} + 2e- -- Zn$$

Once on the cathode, these metal particles immediately react with the nitric acid forming nitrate salts, $Ag(NO_3)$, $Cu(NO_3)_2$, $Zn(NO_3)_2$, which are readily soluble in the water present in the electrolyte. The gold in the slab anode 17, because of its resistance to oxidation, is never oxidized. As the anode dissolves in the electrolyte solution, the gold is precipitated as a mud or slime falling to the floor of the cathode 22, the other metals remaining in the solution, as previously described. The above-noted EADS in the solution performs the function of a detergent or emulsifying agent preventing the refined gold particles falling from the slab anode from floating in the electrolyte solution. This EADS also prevents polarization of the anodes which would impede the process otherwise. Occasionally the gold of the slab anode may form a shield which impedes the free movement of ions, but because of the voltage being applied to the cell 11, the electrically positive metallic ions will burst through this shield and travel onto the cathode 22. When the gold shield is penetrated by the ions, it disintegrates and falls to the bottom of the container cathode 22 and the process continues to completion.

Since gold is never dissolved in the process of this invention, a potential loss of gold in the fumes is prevented. Such loss can occur in other known processes while boiling aqua regia which causes the gold to go into solution. The present process also prevents gold loss caused by failure to precipitate the gold from the electrolyte, and loss caused by spillage and/or breakage of glass and ceramic vessels used in other processes.

In this invention where the gold never goes into solution and once the gold is inquarted, there is no limitation caused by the presence of large or small amounts of silver in the alloy, and there is no need to vary the electrolyte depending on the relative amounts of silver and gold present in the alloy undergoing refinement. Additionally, voltage and current density are less critical than in known prior art processes. Also, the electrolyte solution need not be replenished as long as five liters of it can be used to process one kilogram of alloy having 20% gold.

Another important attribute of this invention is its ready adaptability to large or small amounts of gold refinement or recovery from alloys. Because of the many variables involved, most other processes are not adaptable to recovering relatively small amounts of gold from jewelry or the like. While the hot nitric acid method is flexible in this regard, it is extremely slow and requires many man hours, making it very costly.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A gold recovery apparatus comprising an electrolytic cell in which a gold containing metal alloy body forms the anode of the, the cell including a container cathode, a DC power supply electrically coupled to anode and cathode terminals of the cell, a pollution control system communicating with the cell and operable during cell operation to remove toxic fumes from the cell and neutralize them, a fluid cooling system for the cell, an electrolyte filtration means for the cell including a filter within the container cathode, and control means for the apparatus electrically coupled to the DC power supply and the pollution control system.

2. A gold recovery apparatus as defined in claim 1, and an electrical heating element for said container cathode and being electrically coupled to said control means.

3. A gold recovery apparatus as defined in claim 1, and the apparatus forming a self-contained unit having a body portion containing said cell, said pollution control system and said filtration system and control means, and an overhead storage tank means for electrolyte on said body portion.

4. A gold recovery apparatus as defined in claim 1, wherein the filtration means includes an electrolyte pumping and holding tank means, and said filter being of the type which can pass a liquid electrolyte while blocking passage of refined gold particles precipitated in the bottom of the container cathode.

5. A gold recovery apparatus as defined in claim 4, and said filter comprising a 5 micron filter.

6. A gold recovery apparatus as defined in claim 1, and said fluid cooling system comprising a cooling jacket surrounding the container cathode and having a cooling water inlet and outlet, and valves external to said cell to control the circulation of cooling water in said jacket.

7. A gold recovery apparatus as defined in claim 3, and drying chamber means on said body portion laterally of said cell and adapted to receive bodily therein the container cathode for drying the refined gold therein after removal of the container cathode from said cell and draining it.

8. A gold recovery apparatus as defined in claim 1, and said cell having a transparent lid thereon for confining fumes.

9. A gold recovery apparatus as defined in claim 1, and said filtration means being a reversible means. whereby the filtration means is self-cleaning.

* * * * *